United States Patent

Fujiki et al.

[11] Patent Number: 5,905,101
[45] Date of Patent: May 18, 1999

[54] ABLATOR COMPOSITIONS

[75] Inventors: Hironao Fujiki, Takasaki; Morio Ohashi, Annaka; Hisao Okamoto, Sayama, all of Japan

[73] Assignees: Nissan Motor Co., Ltd., Kanagawa; Shin-Etsu Chemical Co., Ltd., Tokyo, both of Japan

[21] Appl. No.: 08/616,518

[22] Filed: Mar. 19, 1996

[30] Foreign Application Priority Data

Mar. 22, 1995 [JP] Japan ................................ 7-063208

[51] Int. Cl.⁶ ........................................................ C08K 7/04
[52] U.S. Cl. ........................ 523/138; 524/100; 524/298; 524/296; 524/493; 524/496; 524/847
[58] Field of Search ............................. 523/138; 524/493, 524/496, 847, 100, 298, 296

[56] References Cited

U.S. PATENT DOCUMENTS

| | | |
|---|---|---|
| 3,407,110 | 10/1968 | Axelson et al. . |
| 3,429,838 | 2/1969 | Hersh . |
| 3,723,481 | 3/1973 | Bobear . |
| 4,031,059 | 6/1977 | Strauss . |
| 5,399,599 | 3/1995 | Guillot . |
| 5,661,198 | 8/1997 | Inatoni et al. ............................ 528/15 |

FOREIGN PATENT DOCUMENTS

| | | |
|---|---|---|
| 1255-132 | 1/1970 | United Kingdom . |
| 2191115 | 12/1987 | United Kingdom . |

*Primary Examiner*—Melvyn I. Marquis
*Attorney, Agent, or Firm*—McDermott, Will & Emery

[57] ABSTRACT

The invention relates to an ablator composition for providing ablation protection after cure thereof. The ablator composition includes the components of: (A) 100 parts by weight of a silicone elastomer composition which is curable to a silicone elastomer by addition reaction; (B) 50–200 parts by weight of an amorphous silica having an average diameter from 0.1 to 100 $\mu$m; and (C) 1–15 parts by weight of a first fiber having an average length from 0.5 to 6 mm in a longitudinal direction thereof and an average diameter from 1 to 20 $\mu$m. The first fiber is at least one of a carbon fiber and a synthetic quartz fiber. An ablating material prepared by curing the ablator composition is superior in heat insulation and substantially low in ablation rate, and thus protects a spacecraft or the like from a high temperature gas, for a long time.

11 Claims, 3 Drawing Sheets

ABLATOR COMPOSITIONS

BACKGROUND OF THE INVENTION

The present invention relates to ablator compositions for protecting the underlying structure of a spacecraft or the like from the aerodynamic heating caused by travel at high speed during reentry through the atmosphere or caused by contact with gas and the like upon combustion of the propellant. An ablating material which is to be applied to the exterior of the underlying structure is prepared by curing the ablator composition.

British Patent Specification 1255132 discloses an ablative coating composition for protecting the surfaces of aerospace vehicles from the eroding effect of hot gases. This composition comprises: (A) 100 parts by weight of a silicone elastomer, (B) 1.0–100 parts by weight of silicon carbide, (C) 1.0–250 parts by weight of silica, and (D) 0.1–15 parts by weight of a high temperature decomposing fiber which melts at a temperature above 1650° C.

Recently, there has been an increasing demand for ablating materials which are further improved in thermal protection and further lowered in ablation rate.

SUMMARY OF THE INVENTION

It is therefore an object of the present invention to provide an improved ablator composition for protecting aerospace vehicles from the eroding effect of hot gases for a long time.

It is a more specific object of the present invention to provide an improved ablator composition for providing fewer cracks upon combustion, a superior thermal protection and a lower ablation rate, as compared with conventional ablator compositions.

It is another object of the present invention to provide an ablating material prepared by curing the ablator composition.

According to the present invention, there is provided an ablator composition for providing ablation protection after cure thereof, comprising the components of:

(A) 100 parts by weight of a silicone elastomer composition which is curable to a silicone elastomer by addition reaction;

(B) 50–200 parts by weight of an amorphous silica having an average diameter from 0.1 to 100 μm; and (C) 1–15 parts by weight of a first fiber having an average length from 0.5 to 6 mm in a longitudinal direction thereof, and an average diameter from 1 to 20 μm, said first fiber being at least one of a carbon fiber and a synthetic quartz fiber.

An ablating material according to the present invention, which is prepared by curing the above-mentioned ablator composition, is superior in thermal protection (heat insulation) and substantially low in erosion rate (ablation rate). Therefore, the ablating material according to the present invention has a substantially superior advantage in protecting the underlying structure of a spacecraft or the like from the aerodynamic heating caused by travel at high speed during reentry through the atmosphere or caused by contact with gas and the like upon combustion of the propellant.

When an ablator composition according to the present invention further comprises a first component for promoting an adhesion between said silicone elastomer composition and said amorphous silica and another adhesion between said silicone elastomer and said first fiber, the original shape of the ablating material becomes well maintained even after combustion thereof.

When an ablator composition according to the present invention further comprises at least one of a silicon carbide powder and a carbon black powder, the ablating material is further improved in ablation property. When an ablator composition according to the present invention further comprises a silica in the form of aerosol, the ablating material is further reinforced.

DESCRIPTION OF THE PREFERRED EMBODIMENTS

Figure 1:
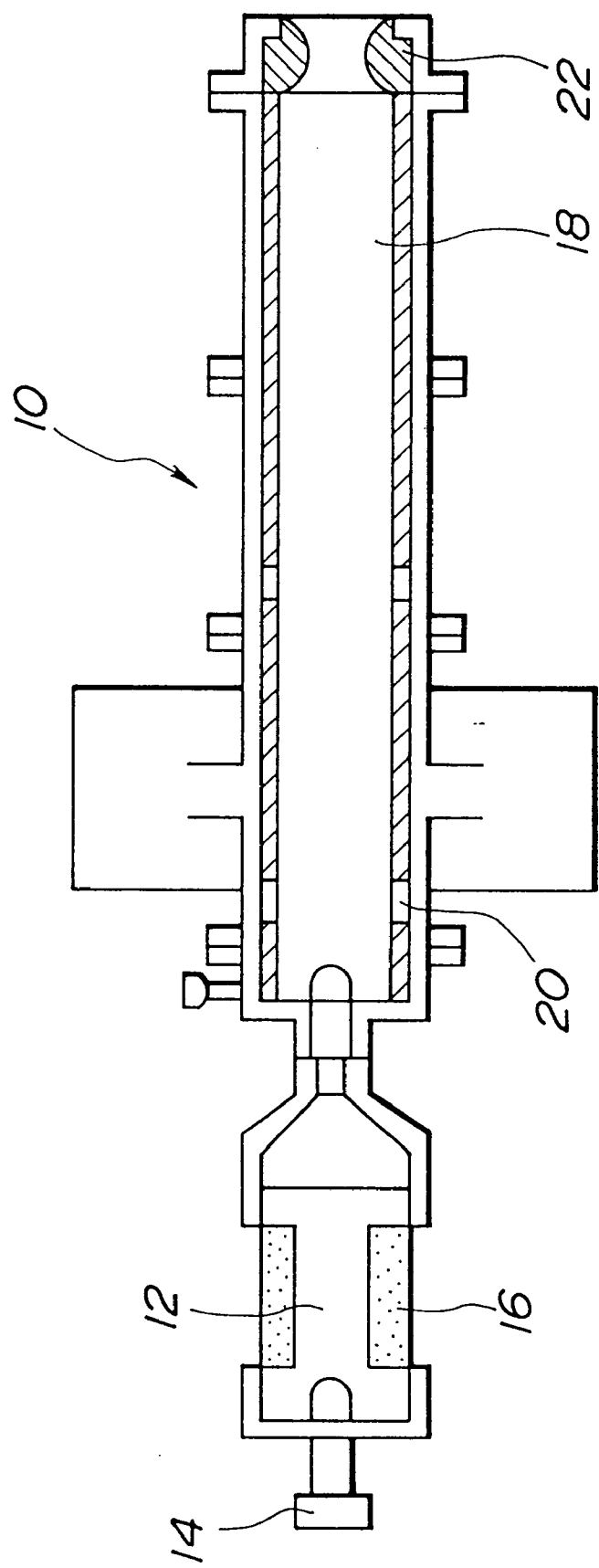
FIG. 1 is a schematic section showing a combustion chamber used as an equipment for testing ablation properties of ablating materials.

An improved ablator composition according to the present invention for providing ablation protection will be described in the following. An ablating material which is to be applied to the exterior of the underlying structure of a spacecraft or the like is prepared by curing the ablator composition. As follows, the ablator composition contains components (A), (B) and (C) as essential components.

The ablator composition contains, as the component (A), 100 parts by weight of a silicone elastomer composition which is curable to a silicone elastomer by addition reaction. This silicone elastomer composition comprises the components of:

(a) a diorganopolysiloxane containing in one molecule thereof at least two lower aliphatic unsaturated groups;

(b) an organohydrogenpolysiloxane serving as a crosslinking agent for curing the ablator composition and containing in one molecule thereof at least two (preferably at least three) hydrogen atoms which are directly bonded to silicon atoms thereof, viz. at least two SiH groups; and (c) a catalyst, which is at least one of metallic platinum and a platinum compound, for curing the ablator composition.

An alkenyl-containing organopolysiloxane as the above-mentioned diorganopolysiloxane has a viscosity from 100 to 100,000 cP at room temperature (e.g., 25° C.), contains in one molecule thereof at least two unsaturated hydrocarbon groups on the average, and is represented by the following general composition formula (1):

$$R_a SiO_{(4-a)/2} \qquad (1)$$

where R represents the same or different monovalent hydrocarbon groups each of which is unsubstituted or substituted and has 1 to 10 (preferably 1 to 8) carbon atoms. Examples of this R are alkyl groups such as methyl, ethyl, propyl, isopropyl, butyl, isobutyl, t-butyl, pentyl, neopentyl, hexyl; cyclohexyl, octyl, nonyl and decyl, alkenyl groups such as vinyl, allyl, propenyl, isopropenyl, butenyl, isobutenyl, hexenyl and cyclohexenyl, aryl groups such as phenyl, tolyl, xylyl and naphthyl, aralkyl groups such as benzyl, phenylethyl and phenylpropyl, and substituents of these groups. In these substitutents, halogen atoms such as fluorine, chlorine and bromine, cyano group and the like are partially or entirely substituted for hydrogen atoms of these groups. Examples of the above substituents are chloromethyl, chloropropyl, bromoethyl, 3,3,3-trifluoropropyl, chlorophenyl and dichlorophenyl.

As stated above, the component (a) contains the substituent of R which may be the same or different, in the molecule. It is necessary that the component (a) contains in one molecule thereof at least two lower aliphatic unsaturated groups (e.g., alkenyl groups) on the average. At least two of all the substituent R are alkenyl groups. The component (a) contains alkenyl groups in an amount generally from about 0.005 to about 5 mol % and preferably from about 0.01 to about 2 mol %, based on the total number of mols of all the substituent R. Each lower aliphatic unsaturated group may be bonded either to a silicon atom positioned at the terminal of the molecule chain or to another silicon atom positioned midway between the terminals of the molecule chain. It is preferable that the component (a) has lower aliphatic unsaturated groups bonded to silicon atoms positioned at both terminals of the molecular chain.

In the above-mentioned general composition formula (1), a is preferably from 1.0 to 2.4 and more preferably from 1.9 to 2.25. The diorganopolysiloxane represented by the formula (1) may have a straight chain structure, a branched chain structure or a three-dimensional network structure having $RSiO_{3/2}$ unit or $SiO_{4/2}$ unit, or a mixture of these structures. It is general that this diorganopolysiloxane is a straight-chain diorganopolysiloxane in which a main chain portion thereof is essentially made up of the repetition of $R_2SiO_{2/2}$ unit, and in which the end group of the molecule is terminated with $R_3SiO_{1/2}$.

In the component (a), the above-mentioned substituent of R bonded to silicon atoms may be essentially either of the above-mentioned groups. Of these groups, it is preferable to use vinyl group as the lower aliphatic unsaturated group and methyl group, phenyl group, 3,3,3-trifluoropropyl group and the like as other substituents.

The component (a) may be produced by one of methods known to a person skilled in the art. According to these methods, the component (a) can be obtained by conducting an equilibration reaction in the presence of an alkali or acid catalyst, using an organocyclopolysiloxane and a hexaorganodisiloxane which is represented by $R_3SiOSiR_3$.

The component (a) has the following exemplary general formulas (3), (4) and (5):

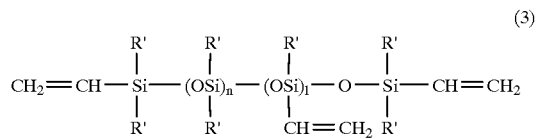

(3)

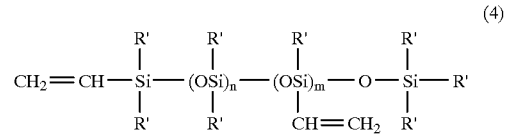

(4)

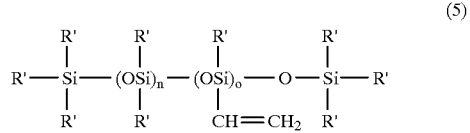

(5)

where, in the formula (3), (n+1) is an integer from 50 to 1,500, and 1 is an integer of at least 0; where, in the formula (4), (n+m) is an integer from 50 to 1,500, and m is an integer of at least 1; where, in the formula (5), (n+o) is an integer from 50 to 1,500, and o is an integer of at least 2; and where, in the formulas (3), (4) and (5), R' is the same or different monovalent hydrocarbon groups each of which does not have an aliphatic unsaturated bond, and each of which is unsubstituted or substituted. Examples of R' are aliphatic saturated hydrocarbon groups (i.e., alkyl groups) such as methyl, ethyl and propyl, aryl groups such as phenyl and xylyl, and halogen-substituted hydrocarbon groups such as 3,3,3-trifluoropropyl.

The organohydrogenpolysiloxane as the component (b) reacts with the component (a) and serves as crosslinking agent for curing the ablator composition. The molecular structure of the component (b) is not particularly limited, and may have a straight chain structure, a cyclic structure, a branched chain structure, a three-dimensional network structure, and the like. The component (b) usually has about 3 to 500 silicon atoms, preferably about 4 to 200 silicon atoms in its molecule, and contains in one molecule thereof at least two (preferably at least three) hydrogen atoms which are directly bonded to silicon atoms thereof, and these hydrogen atoms (i.e., SiH groups) may be positioned either at the terminals of the molecular chain or midway between the terminals of the molecular chain.

The component (b), for example, at least two, preferably at least-three siloxane units in its molecule represented by the following general unit formula (6):

(6)

where $R^2$ represents the same or different monovalent hydrocarbon groups each of which is unsubstituted or substituted and has 1 to 10 (preferably 1 to 8) carbon atoms, b is 0, 1 or 2, and c is 1 or 2, with a proviso that (b+c) is 1, 2 or 3. The above-mentioned examples of the substituent R of the general composition formula (1) of the component (a) can be cited as examples of $R^2$. Furthermore, of the above-mentioned examples of R, monovalent hydrocarbon groups free from aliphatic unsaturated bond can be preferably cited as examples of $R^2$. Methyl, phenyl, and 3,3,3-trifluoropropyl are more preferable examples of $R^2$ from the view points of compatibility with the component (a), the ablating material's characteristics and the like.

Substituents bonded to silicon atoms of other siloxane units of the component (b), except the abovementioned at least two siloxane units having hydrogen atom(s) bonded to a silicon atom therein, are unsubstituted or substituted monovalent hydrocarbon groups which are the same as those represented by R of the formula (1). Of the examples of R, monovalent hydrocarbon groups, except aliphatic unsaturated hydrocarbon groups, can be preferably cited as the substituents.

The amount of the component (b) is such that the amount of hydrogen atoms bonded to silicon atoms (i.e., SiH groups) is preferably from 0.5 to 5.0 equivalents and more preferably from 0.8 to 2.0 equivalents, per one alkenyl group contained in the component (a). If it is less than 0.5 equivalents, the crosslinking density may become too low. With this, the cured silicone elastomer may be adversely influenced in heat resistance. If it is more than 5.0 equivalents, a problem of foaming may occur by dehydrogenation, and the cured silicone elastomer may be adversely influenced in heat resistance.

The component (c) is used as a catalyst for promoting an addition reaction (i.e., hydrosilylation reaction) of the component (a) with the component (b). The component (c) is at least one of metallic platinum and a platinum compound known to a person skilled in the art. Examples of the component (c) are metallic platinum including platinum black, platinum compounds such as chloroplatinic acid and an alcohol-altered chloroplatinic acid, and complexes of chloroplatinic acid and a ligand which is one of an olefin, aldehyde, vinyl siloxane and acetylenealcohol. The amount of the component (c) is arbitrarily adjusted depending on the curing rate, and is preferably from 0.1 to 2,000 ppm and more preferably from 1 to 1,000 ppm by weight of platinum atom contained in the catalyst, based on the total weight of the component (a).

In the invention, the component (A) is cured by addition reaction. This type of cure is superior to other types of cure such as the cure by condensation reaction and the cure by using organic peroxide(s), because, according the cure by addition reaction, for example, the condensation by-products are not caused; the surface cure is not impeded; and the cured ablating material is stable in dimensions. Furthermore, the ablating material easily becomes nonflammable, because the component (A) contains the platinum catalyst.

It is an important character of the invention that the ablator composition contains the component (B), amorphous silica, for lowering ablation rate (i.e., the rate of decrease (recess) of the ablation material by a high-temperature gas). If a conventional crystalline silica, as disclosed in British Patent Specification 1255132, is used in the invention, an advantageous effect can not be particularly obtained. Only if an amorphous silica according to the invention is used, it is possible to decrease ablation rate by about 30% as compared with conventional ablator compositions.

Examples of the component (B) are an amorphous silica graded as fused silica, and another amorphous silica prepared by melt-oxidizing metallic silicon. The component (B) has an average particle diameter from 0.1 to 100 $\mu$m, preferably from 0.5 to 50 $\mu$m. If it is less than 0.1 $\mu$m, the ablator composition becomes too high in viscosity. With this, the application of the ablator composition becomes difficult, and the ablating material becomes inferior in heat insulation. If it is greater than 100 $\mu$m, the ablation material becomes brittle, and thus the ablation material itself may be blown off by a high temperature gas.

The amount of the component (B) is from 50 to 200 parts by weight and more preferably from 60 to 120 parts by weight, per 100 parts by weight of the component (A). If it is less than 50 parts by weight, the original shape of the ablating material can not be maintained when the ablating material is exposed to a high temperature gas. If it is greater than 200 parts by weight, the ablation rate increases too much, and the ablating material becomes inferior in heat insulation. Examples of commercial products of the component (B) are SO-25H (trade name) of Admatex Co., FS-20, FS-30, FS-40 and FS-74 (trade names) of Denki Kagaku Kogyo Co., and RD-8 (trade name) of Tatsumori Co.

The component (C), the first fiber which is at least one of a carbon fiber and a synthetic quartz fiber, is useful for binding together the carbonized surface layer caused by burning of the ablating material and the underlying virgin layer (i.e., the non-carbonized or unburned original layer) of the ablating material.

The first fiber becomes effective when it has an average length from 0.5 to 6 mm and preferably from 1 to 4 mm, in a longitudinal direction thereof. If it is shorter than 0.5 mm, the binding effect is substantially decreased, and thus the carbonized surface layer may be blown away by a high temperature gas. If it is longer than 6 mm, workability of the ablator composition is considerably impaired, and fibers may be oriented in one direction, thereby impairing the binding effect.

The first fiber has an average diameter from 1 to 20 $\mu$m. If it is less than 1 $\mu$m, the first fiber may be broken when mixed with other components, and thus it becomes difficult to maintain the original length of the first fiber. If it is greater than 20 $\mu$m, it becomes difficult to uniformly mix the first fiber with other components, the cured ablating material becomes insufficient in flexibility, and the ablating material becomes inferior in heat insulation because the ablating material conducts heat along the first fiber.

The amount of the component (C) is from 1 to 15 parts by weight per 100 parts by weight of the component (A). If it is less than 1 part by weight, the binding effect becomes insufficient. If it is greater than 15 parts by weight, the ablator composition becomes inferior in workability and heat insulation.

In addition to the above-mentioned components (A), (B) and (C), it is preferable to add reactive compound(s) that promotes adhesion between the silicone resin and the fillers such as the components (B) and (C), in the inside of the ablating material. Thus, the reactive compound has an advantageous effect on the maintenance of the original shape of the ablating material after burning thereof. Examples of such reactive compound are polyfunctional compounds which has no silicon atoms in its molecule such as triallylisocyanurate, triallylpyromellitate and diallylphthalate, and adhesion promoting agents generally used for a silicone composition, such as organoalkoxysilanes, for example, organotrialkoxysilanes including vinyltrialkoxysilane, glycidyloxypropyltrialkoxysilane, organosiloxane compounds each containing in one molecule thereof at least one hydrogen atom directly bonded to silicon atom and containing at least one of trialkoxysilyl group and epoxy group.

In the invention, it is optional to add a silicon carbide powder disclosed in British Patent Specification 1255132, a carbon black powder, and the like, to other components, for improving ablation properties of the ablating material. Furthermore, it is optional to add silica in the form of aerosol (i.e., fumed silica), which is commonly used as a reinforcing agent of a silicone rubber composition, a reaction controlling agent, and a coloring agent, and the like, as long as these optional additives do not damage the aimed characteristics of the ablating material.

The present invention will be illustrated with the following nonlimitative examples.

EXAMPLE 1

An ablator composition was prepared as follows. As the component (a) (i.e., the diorganopolysiloxane), a dimethylpolysiloxane was used in this example. This dimethylpolysiloxane had both terminals of the molecular chain which are terminated with dimethylvinylsilyl groups and had a viscosity of 5,000 cP at 25° C. Hereinafter, this dimethylpolysiloxane will be referred to as the polysiloxane ($\alpha$). Furthermore, a soluble silicone resin was used in this example. This silicone resin was composed of $(CH_3)_3SiO_{1/2}$ unit, $(CH_2=CH)(CH_3)_2SiO_{1/2}$ unit and $SiO_2$ unit, and contained vinyl group in amount of 0.08 mol/100 g. In this silicone resin, the ratio of the total of the $(CH_3)_3SiO_{1/2}$ unit and $(CH_2=CH)(CH_3)_2SiO_{1/2}$ unit to the $SiO_2$ unit was 0.9. Hereinafter, this silicone resin will be referred to as the silicone resin ($\gamma$). Still furthermore, as the component (b) (i.e., the organohydrogenpolysiloxane), a methylhydrogenpolysiloxane was used in this example. This methylhydrogenpolysiloxane has the following average structural formula (7), and hereinafter will be referred to as the polysiloxane (δ).

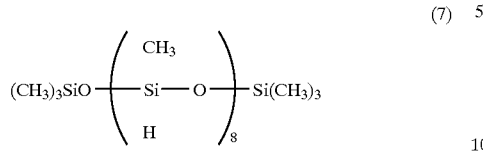

(7)

In the preparation of an ablator composition, at first, 95 parts by weight of the polysiloxane (α), 5 parts by weight of the silicone resin (γ), and 5 parts by weight of a silica in the form of aerosol (i.e., fumed silica) which had been treated to become hydrophobic, were mixed together. This mixture was heated, and then 100 parts by weight of an amorphous silica having an average diameter of 1 μm and a platinum catalyst containing vinylsiloxane ligand were added to the heated mixture to prepare a preparatory ablator composition: This platinum catalyst contained 200 ppm of elemental platinum based on the total weight of the polysiloxane (α) and the silicone resin (γ).

Separately, a plurality of fibrous materials respectively including carbon fibers and synthetic quartz fibers were prepared for use. A plurality of the above preparatory ablator compositions were prepared by repeating the above procedure, in number corresponding to the number of the fibrous materials. Each of the fibrous materials had an average length of 3 mm. The fibrous materials were separately respectively added to the preparatory ablator compositions. Then, 2 parts by weight of the polysiloxane (δ) was added to each preparatory ablator composition to prepare each ablator composition, followed by defoaming and then by curing at 120° C. for 1 hr into a sheet.

Each sheet was punched to obtain a test piece having a width of 5 cm, a length of 10 cm and a thickness of 2 mm. Each test piece was subjected to a heating test at about 1,300° C. with an oxygen flame burner for 1 min with a distance of 3 cm between the test piece and the burner. After the test, the condition of each test piece was observed. With this, it was found that only the test pieces respectively containing the carbon fibers and the synthetic quarts fibers among other fibrous materials are well maintained in their original shapes.

In addition to the above-mentioned test piece containing carbon fibers having an average length of 3 mm, other test pieces each containing carbon fibers were prepared in the same manner as above and then subjected to the same heating test as above. With this, as to the test pieces containing carbon fibers having an average length shorter than 0.5 mm, the carbonized (burned) surface layer was blown away from the underlying virgin layer by the heating test. Furthermore, as the test pieces containing carbon fibers having an average length longer than 6 mm, the fibers were oriented only in a lateral direction, and these test pieces were inferior in binding strength between the carbonized surface layer and the underlying virgin layer.

Furthermore, the above-mentioned preparation of the test piece containing carbon fibers having an average length of 3 mm was repeated except in that 0.5 parts by weight of a reactive additive composed of triallylisocyanurate, vinyltrialkoxysilane and glycidyloxypropyltrialkoxysilane was additionally added to the ablator composition, for improving the binding strength between the silicone resin and the fillers. The thus prepared test piece showed a better result, in the heating test, in the maintenance of the original shape thereof, than the test piece not containing such additive.

Comparative Example 1

In this comparative example, a crystalline silica having an average particle diameter of 10 μm was used in place of the amorphous silica of Example 1.

An ablator composition was prepared by at first mixing together 95 parts by weight of the polysiloxane (α), 5 parts by weight of the silicone resin (γ), 100 parts by weight of the crystalline silica, and 200 ppm of the platinum catalyst to prepare a preparatory ablator composition, then by adding 5 parts by weight of carbon fiber having a length of 3 mm and an average diameter of 8 μm to the preparatory ablator composition, followed by the addition of 2 parts by weight of the polysiloxane (δ), 0.5 parts by weight of triallylisocyanurate as an agent for maintaining the original shape, and 1 part by weight of tetravinyltetramethylcyclotetrasiloxane as a reaction controlling agent.

Figure 2:
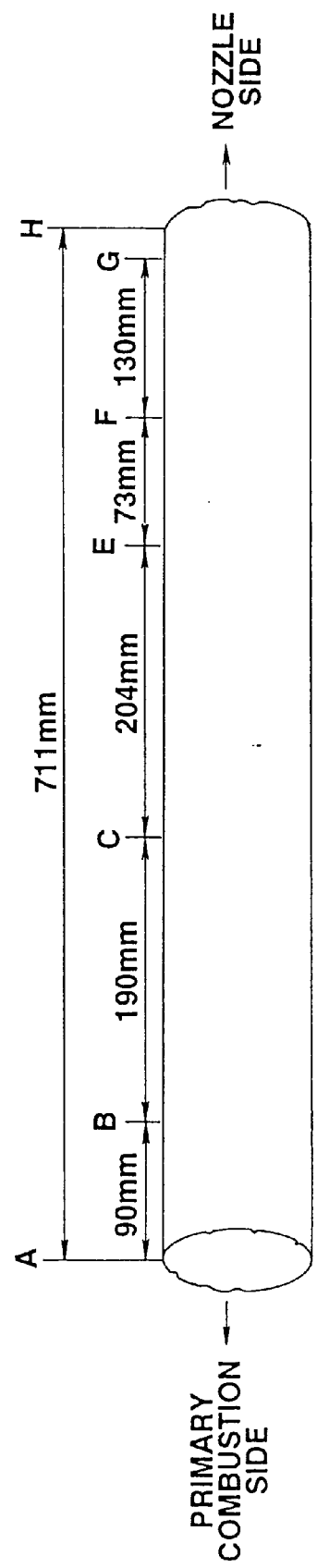
FIG. 2 is a schematic side view showing a secondary combustion chamber of the equipment of FIG. 1, and showing ablation rate measurement positions A–C and E–H corresponding to those in FIG. 3, in the ablation property evaluation test.
Figure 3:
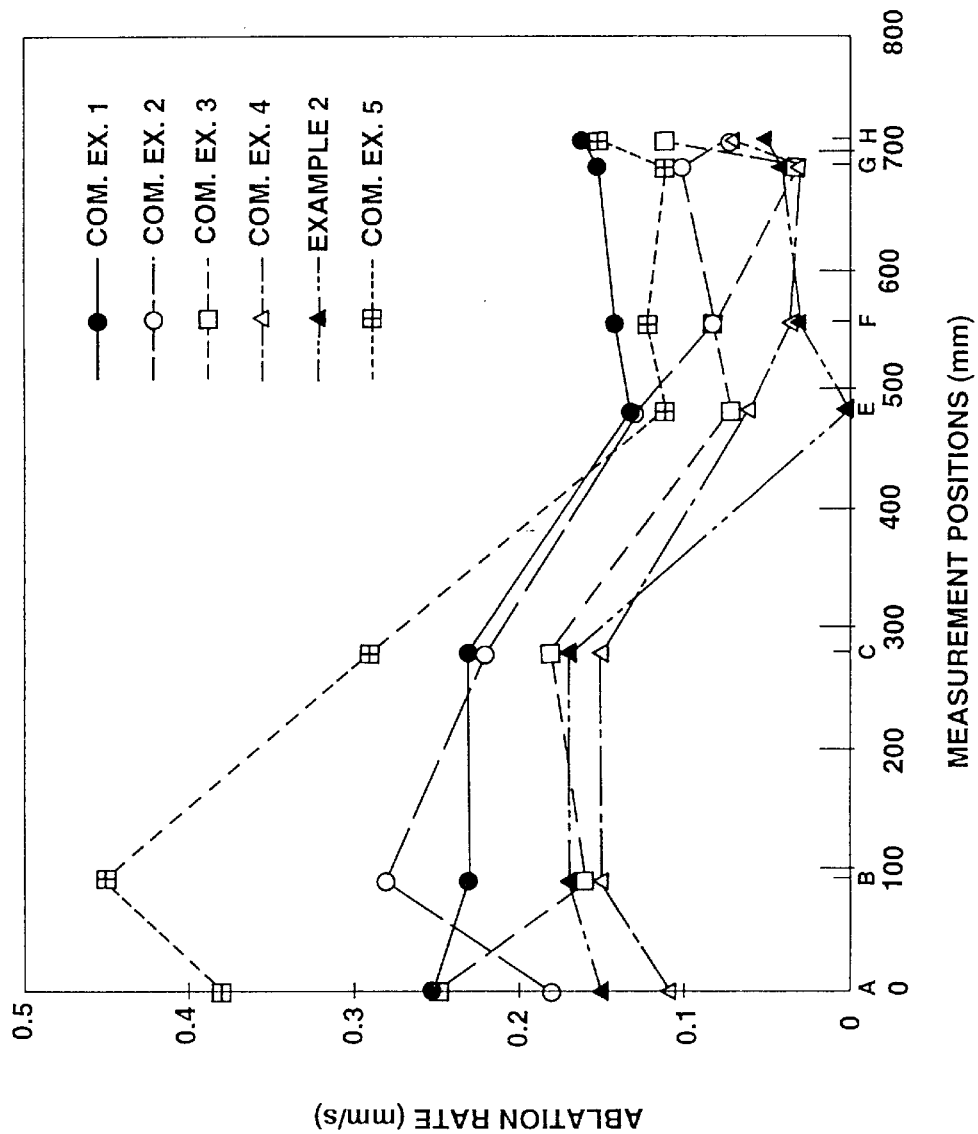
FIG. 3 is a graph illustrating ablation rates of ablating materials according to Example 2 and Comparative Examples 1–5, at measurement positions A–C and E–H, in the ablation property evaluation test.

Then, an ablation property evaluation test was conducted as follows, using the above-prepared ablator composition. In this test, an ablation property evaluation equipment 10 was used, as shown in FIG. 1. This equipment 10 was provided with a primary combustion chamber 12 having an igniter 14 and a gas generating agent 16, and a secondary combustion chamber 18 having an air introducing opening 20 and a nozzle 22. In this test, the ablator composition was applied to the inside surface of the secondary combustion chamber 18, followed by cure of the applied ablator composition. Then, a combustion of the ablating material was carried out, using the equipment 10, with an air flow rate of 2.56 kg/s, a fuel flow rate of 0.16 kg/s, a combustion chamber pressure of 6.5 kgf/cm², and a combustion time of 5.5 sec., to determine ablation rate (i.e., the surface recess rate) of the cured ablator composition, at the positions A, B, C, E, F, G and H of the secondary combustion chamber 16, as shown in FIG. 2. The results are shown in FIG. 3, together with those of the aftermentioned comparative Examples 2–5 and Example 2. Furthermore, heat conductivity of the cured ablator composition was determined in this test, and the surface condition of the burned ablator material was observed after the combustion. The results are shown in Table 1, together with those of the aftermentioned Comparative Examples 2–5 and Example 2.

TABLE 1

| | Com. Ex. 1 | Com. Ex. 2 | Com. Ex. 3 | Com. Ex. 4 | Ex. 2 | Com. Ex. 5 |
|---|---|---|---|---|---|---|
| Heat Cond. ($10^{-4}$ kcal/cm · sec · °C.) | 12.4 | 12.6 | 11.2 | 9.7 | 7.5 | 5.8 |
| Condition after Combustion | Good (no cracks) | Good (no cracks) | Good (no cracks | A few cracks) | Good (no cracks) | Many Cracks |

Comparative Example 2

In this comparative example, as the component (a), a methylphenylpolysiloxane was used. This polysiloxane had both terminals of the molecular chain, which are terminated with dimethylvinylsilyl groups, had a viscosity of 4,500 cP at 25° C., and contained 70 mol % of the following unit (8) and 30 mol % of the following unit (9). This polysiloxane will be hereinafter referred to as the polysiloxane (β).

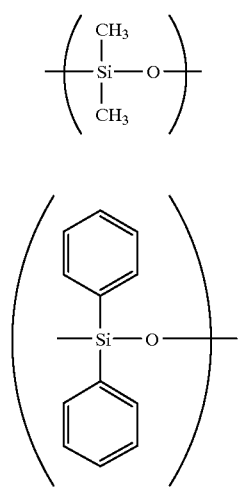

In this comparative example, Comparative Example 1 was repeated except in that 100 parts by weight of the polysiloxane (β) was used in place of the polysiloxane (α) and the silicone resin (γ) and that 200 ppm of the platinum catalyst, based on the total weight of the polysiloxane (β), was used, as shown in Table 2.

Comparative Example 3–4

In these comparative examples, Comparative Example 2 was repeated except in that the amount of the crystalline silica was changed to 80 and 65 parts by weight, respectively, as shown in Table 2.

EXAMPLE 2

In this example, Comparative Example 2 was repeated except in that 80 parts by weight of a fused silica having an average particle diameter of 1 μm was used as an amorphous silica, in place of the crystalline silica, as shown in Table 2. The ablation material of this example had no cracks after the test and was sufficiently low in heat conductivity and thus superior in heat insulation, as shown in Table 1. Furthermore, this ablation material was sufficiently low in ablation rate, as shown in FIG. 3.

Comparative Example 5

In this comparative example, Comparative Example 2 was repeated except in that 6.5 parts by weight of silica microballoons having a true specific gravity of 0.2 was used in place of the crystalline silica, as shown in Table 2.

What is claimed is:

1. An ablator composition for providing ablation protection after cure thereof, comprising:
   100 parts by weight of a silicone composition curable to a silicone elastomer by addition reaction;
   50–200 parts by weight of an amorphous silica having an average diameter from 0.1 to 100 μm; and
   1–15 parts by weight of a fiber having an average length from 0.5 to 6 mm in a longitudinal direction thereof and an average diameter from 1 to 20 μm, said fiber being at least one of a carbon fiber or a synthetic quartz fiber.

2. An ablator composition according to claim 1, further comprising an adhesion promoting component for promoting adhesion between said composition and said amorphous silica and between said silicone elastomer and said fiber.

3. An ablator composition according to claim 2, wherein said adhesion promoting component is at least one polyfunctional compound selected from the croup consisting of triallylisocyanurate, triallylpyromellitate and diallylphthalate.

4. An ablator composition according to claim 2, wherein said adhesion promoting component is at least one selected from the group consisting of organoalkoxysilanes, and organosiloxane compounds each containing in one molecule thereof at least one hydrogen atom directly bonded to at least one silicon atom and containing at least one of trialkoxysilyl group or epoxy group.

5. An ablator composition according to claim 1, further comprising an ablator improving component for improving the ablator composition in ablation protection property, said ablator improving component being at least one of a silicon carbide powder or a carbon black powder.

6. An ablator composition according to claim 1, further comprising a silica in the form of aerosol, for reinforcing the ablator composition.

7. An ablator composition according to claim 1, wherein said silicone composition comprises:
   (a) a diorganopolysiloxane containing in one molecule thereof at least two lower aliphatic unsaturated groups;
   (b) an organohydrogenpolysiloxane for curing the ablator composition, said organohydrogenpolysiloxane containing in one molecule thereof at least two hydrogen atoms which are directly-bonded to at least one silicon atom thereof; and
   (c) a catalyst which is at least one of metallic platinum or a platinum compound, for curing the ablator composition.

TABLE 2

| Ablation Compositions (parts by weiqht) | Comparative Example 2 | Comparative Example 3 | Comparative Example 4 | Example 2 | Comparative Example 5 |
|---|---|---|---|---|---|
| Polysiloxane (β) | 100 | 100 | 100 | 100 | 100 |
| Crystalline Silica | 100 | 80 | 65 | — | — |
| Silica Microballoons | — | — | — | — | 6.5 |
| Amorphous Silica | — | — | — | 80 | — |
| Carbon Fibers | 5 | 5 | 5 | 5 | 5 |
| Triallyisocyanurate | 0.5 | 0.5 | 0.5 | 0.5 | 0.5 |
| Polysiloxane (δ) | 2 | 2 | 2 | 2 | 2 |
| Platinum Catalyst (ppm) | 200 | 200 | 200 | 200 | 200 |
| Reaction Controlling Agent | 1 | 1 | 1 | 1 | 1 |

8. An ablator composition according to claim 7, wherein said diorganopolysiloxane is an alkenyl-containing organopolysiloxane which has. a viscosity from 100 to 100,000 centipoises at 25° C., said diorganopolysiloxane being represented by the following general compositional formula:

$$R_aSiO_{(4-a)/2}$$

where R represents the same or different monovalent hydrocarbon groups each of which is unsubstituted or substituted and has 1 to 10 carbon atoms, and R is at least one selected from the group consisting of alkyl groups, alkenyl groups, aryl groups, aralkyl groups, and substituents of these groups.

9. An ablator composition according to claim 7, wherein said organohydrogenpolysiloxane has at least two siloxane units in its molecule represented by the following general unit formula:

$$R^2_bH_cSiO_{(4-b-c)/2}$$

where $R^2$ represents the same or different monovalent hydrocarbon groups each of which is unsubstituted or substituted and has 1 to 10 carbon atoms, b is 0, 1 or 2, and c is 1 or 2, with a proviso that the total of b and c is 1, 2 or 3.

10. An ablator composition according to claim 7, wherein said hydrogen atoms.directly bonded to a silicon atom of said organohydrogenpolysiloxane are in total in an amount from 0.5 to 5.0 equivalents per one alkenyl group contained in said diorganopolysiloxane.

11. An ablating material which is prepared by curing an ablator composition according to claim 1.

* * * * *